(12) United States Patent
Williams et al.

(10) Patent No.: US 7,822,003 B2
(45) Date of Patent: *Oct. 26, 2010

(54) METHOD AND SYSTEM FOR PROVIDING SYSTEM INFORMATION IN A COMMUNICATION NETWORK

(75) Inventors: Carl Williams, Palo Alto, CA (US); Robert Jaksa, Irving, TX (US)

(73) Assignee: FutureWei Technologies, Inc., Plano, TX (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/755,637

(22) Filed: May 30, 2007

(65) Prior Publication Data

US 2008/0137596 A1 Jun. 12, 2008

Related U.S. Application Data

(60) Provisional application No. 60/829,598, filed on Oct. 16, 2006.

(51) Int. Cl.
*H04Q 7/24* (2006.01)
(52) U.S. Cl. .................. 370/338; 370/331; 370/395.31; 455/445; 455/552.1; 455/557
(58) Field of Classification Search ................ 370/328, 370/329, 338, 395.31; 455/433, 445, 552.1, 455/557
See application file for complete search history.

(56) References Cited

U.S. PATENT DOCUMENTS 7,006,472 B1 2/2006 Immonen et al.

FOREIGN PATENT DOCUMENTS

| CN | 1592445 A | 3/2005 |
|---|---|---|
| KR | 20050079407 A | 8/2005 |
| WO | WO 2004/068767 A2 | 8/2004 |

*Primary Examiner*—Temica M Beamer
(74) *Attorney, Agent, or Firm*—Slater & Matsil, L.L.P.

(57) ABSTRACT

Method and system for providing system information in a communication network. According to an embodiment, the present invention provides a method for providing networking routing in compliance with a Mobile IP protocol. The method includes providing a mobile node, which includes a plurality of interfaces. The plurality of interfaces includes a first interface and a second interface. The first interface is associated with a first service, a second service, and a first address. The second interface is associated with a third service and a second address. The method also includes providing a home agent that is configured to store a plurality of entries associated with mobile nodes. The method additionally includes sending a first packet from the mobile node to the home agent. The first packet includes at least a first entry and a second entry.

29 Claims, 4 Drawing Sheets

| option type | option length | S E F L O W T I R H | P R I | 301 |
|---|---|---|---|---|
| FID | Action | Status | CLS | |

| Start port | Port length (# of ports) | | 302 |
|---|---|---|---|
| 128 | 3 | | |
| 154 | 1 | | |
| 158 | 5 | | |

Figure 3

METHOD AND SYSTEM FOR PROVIDING SYSTEM INFORMATION IN A COMMUNICATION NETWORK

CROSS-REFERENCES TO RELATED APPLICATIONS

This application claims priority to U.S. Provisional Application No. 60/829,598, filed Oct. 16, 2006, commonly assigned, incorporated by reference herein for all purposes. This application is related to U.S. Provisional Application No. 60/814,190, filed Jun. 16, 2006, commonly assigned, incorporated by reference herein for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention relates generally to telecommunication techniques. More specifically, embodiments according to the present invention provide techniques for providing and storing information related to data flow direction in an efficient manner. In particular, various embodiments according to the present invention are compatible with the mobile IPv6 standard. Merely by way of example, the invention has been applied to handover techniques for mobile devices. But it would be recognized that the invention has a much broader range of applicability.

In the past decade, communication technologies rapidly developed. Various communication mediums have been explored, ranging from power line, telephone line, optical line, to wireless communication. Most recently, wireless communication has become more and more popular and widely adopted for the convenience that it offers.

Wireless communication has many applications. Among other things, mobile phones that utilize wireless communication techniques are one of the most popular communicational devices, who claim billions of users today. Another popular application using wireless communication devices is mobile computing devices accessing local networks via wireless links. Through the local wireless networks, mobile computing devices are able to connect to the Internet using wireless internet protocol (IP) technology. Most recently, standard setting organizations such as the Internet Engineering Task Force (IETF) and Institute of Electrical and Electronics Engineers (IEEE) have developed and promoted various standards for wireless communication networks. For example, the IETF has developed a Mobile IP standard, which is a communications protocol that is designed to allow mobile device users to move from one network to another while maintaining a permanent IP address. In the specification of the application, a mobile device that is in compliance with the Mobile IP standard is referred to as a mobile node (MN), which is broadly defined and should not unduly limit the scope of claims. For example, mobile node may refer to network nodes that is capable of changing location, change links (i.e., addresses), and maintain its connectives using its home address. As merely an example, a mobile can be a laptop, a PDA, etc.

According to the Mobile IP standard (e.g., more specifically the Mobile IPv6 standard), an MN can have two addresses: a permanent home address and a care of address (CoA). Typically, the permanent home address is associated with the home agent that the MN is connected, and the CoA is associated with the network the MN is visiting. For example, a home agent stores information about MN whose permanent address is in the home agent's network. For an MN to be able to connected to more than one network, the MN may have more than one CoA addresses. For example, multiple CoAs (MCoA) are required for certain applications (e.g., in a handover process). In addition, for each type of service, there may be multiple port numbers. Among other things, port numbers help define the type of traffic to be transferred. In addition, port numbers can be used in filtering network flows.

Mobile nodes are not the only entities in a Mobile IP network that have multiple CoA's. Correspondent nodes (CN) often have multiple CoA's as well. For example, a correspondent node is a node that communicates with a mobile node. It is to be understood that the terms correspondent node and CN are broadly defined, and should not unduly limit the scope of claims. For example, a CN can be an access router that provides connectivity to an MN, and the CN does not have to be compatible with the Mobile IP standard. Depending on the application, a CN may be a host, router, and other network entities that are involved in transferring data for a mobile node.

The correspondent nodes often have multiple CoA's, as each CoA is used for a specific type of service. For example, a CN has interfaces for different services (e.g., web traffic, VoIP traffic, FTP traffic, etc.) and for each of the service there is a corresponding CoA address. Typically, by having specific CoA for each of the services offered by the same CN, network traffic can be routed in an efficient manner. As an example, each of the services may be assigned one or more port numbers. Often, port numbers are an important part of directing network flow, as network traffics are filtered and directed based on the port numbers. In addition, there are other aspects as well.

In order to be able to efficiently use port numbers, it is important for various nodes in a network system to create, communicate, and update information associated with data transmissions. Over the past, various conventional techniques have adopted for providing and updating this kind of information. Unfortunately, these conventional techniques have been inadequate.

Therefore, an improved system and method for updating network system is desired.

BRIEF SUMMARY OF THE INVENTION

The present invention relates generally to telecommunication techniques. More specifically, embodiments according to the present invention provide techniques for providing and storing information related to data flow direction in an efficient manner. In particular, various embodiments according to the present invention are compatible with the mobile IPv6 standard. Merely by way of example, the invention has been applied to handover techniques for mobile devices. But it would be recognized that the invention has a much broader range of applicability.

According to an embodiment, the present invention provides a method for providing networking routing in compliance with a Mobile IP protocol. The method includes providing a mobile node, which includes a plurality of interfaces.

The plurality of interfaces includes a first interface and a second interface. The first interface is associated with a first service, a second service, and a first address. The second interface is associated with a third service and a second address. The method also includes providing a home agent that is configured to store a plurality of entries associated with mobile nodes. The method additionally includes sending a first packet from the mobile node to the home agent. The first packet includes at least a first entry and a second entry. The first entry includes at least the first interface, the first service, the first address, and port numbers being associated with the first service and the second service. The port numbers are nonconsecutive. The method further includes storing at least the first entry and the second entry by the home agent.

According to another embodiment, the present invention provides a system for providing networking routing in compliance with a Mobile IP protocol. The system includes a node that includes a plurality of interfaces. The plurality of interfaces includes a first interface and a second interface. The first interface is associated with a first service, a second service, and a first address. The second interface is associated with a third service and a second address. The system additionally includes a database. The database is configured to store a plurality of entries associated with mobile nodes. The node sends a first packet to the database. The first packet includes at least a first entry and a second entry. The first entry includes information for at least the first interface, the first service, the first address, and port numbers being associated with the first service and the second service, the port numbers being nonconsecutive.

According to yet another embodiment, the present invention provides a method for providing networking routing in compliance with a Mobile IP protocol. The method includes providing a node. The node includes a plurality of interfaces. The plurality of interfaces includes a first interface and a second interface. The first interface is associated with a first service, a second service, and a first address. The second interface is associated with a third service and a second address. The method also includes providing a home agent. The home agent is configured to store a plurality of entries associated with mobile nodes. The method further includes receiving a first packet from the node by the home agent. The first packet includes at least a first entry. The first entry includes information for at least the first interface, the first service, the second service, a first port number, a second port number, and at least a first port count and a second port count. The first port number and the second port number are nonconsecutive. In addition, the method includes assigning a first plurality of port numbers to the first service using the first port number and the first port count. Also, the method includes assigning a second plurality of port numbers to the second service using the second port number and the second port count.

It is to be appreciated that the various embodiments of the present invention provide advantages over conventional techniques. In various embodiments, the present invention provides a technique for providing and updating various system information from one node to another, thereby allowing the efficient routing of data. In a specific embodiment, the present invention provides a method in mobile node provides information associated with data transmission to other nodes in an efficient manner. In addition, it is to be appreciated that embodiments of the present invention can be implemented in conjunction with conventional network techniques and standards (e.g., the Mobile IPv6 standard). For example, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 3 is a simplified diagram illustrating a message for providing network connectivity information. This diagram is merely an example, which should not unduly limit the scope of the claims. One of ordinary skill in the art would recognize many variations, alternatives, and modifications.

DETAILED DESCRIPTION OF THE INVENTION

The present invention relates generally to telecommunication techniques. More specifically, embodiments according to the present invention provide techniques for providing and storing information related to data flow direction in an efficient manner. In particular, various embodiments according to the present invention are compatible with the mobile IPv6 standard. Merely by way of example, the invention has been applied to handover techniques for mobile devices. But it would be recognized that the invention has a much broader range of applicability.

As discussed above, various conventional techniques for providing mobile node information have been inadequate. According to an exemplary conventional technique, mobile node sends to its home agent or correspondent node a message specifying a range of port numbers that are associated with a specific CoAs and/or application. For example, to specify nonconsecutive port numbers associated with respective CoAs, separate messages need to be communicated between nodes.

Typically, various types of ports are defined for communication networks. For example, TCP and UDP ports are network ports. IANA is responsible for assigning TCP and UDP port numbers to specific uses. The port numbers are divided into three ranges: the Well Known Ports, the Registered Ports, and the Dynamic and/or Private Ports.

The Ports that are popular are those in the range 0"C1023. On Unix OSs, opening a port in this range to receive incoming connections requires administrative privileges, although this all might change. The Registered Ports are those in the range 1024-49151. The Dynamic and/or Private Ports are those in the range 49152-65535.

Using MONAMI6 technologies a multi-homed Mobile IPv6 Node is able to use multiple interfaces at the same time, according to some preference settings. A type of preference setting is for the Mobile Node to indicate to the CNs that based on the specific service or application that those flows should be directed to a specific interface associated with a given CoA. The way in which to determine a service or application is via the network ports. According to embodiments of the present invention, techniques are provided for defining network ports in a flow identification type of mobility option. More specifically, a method is provided for specifying multiple ranges as well as multiple ports that may not be in a range. For example, an embodiment of the present invention uses a specific format that allows addresses and non-consecutive port numbers thereof to be communicated.

Figure 1:
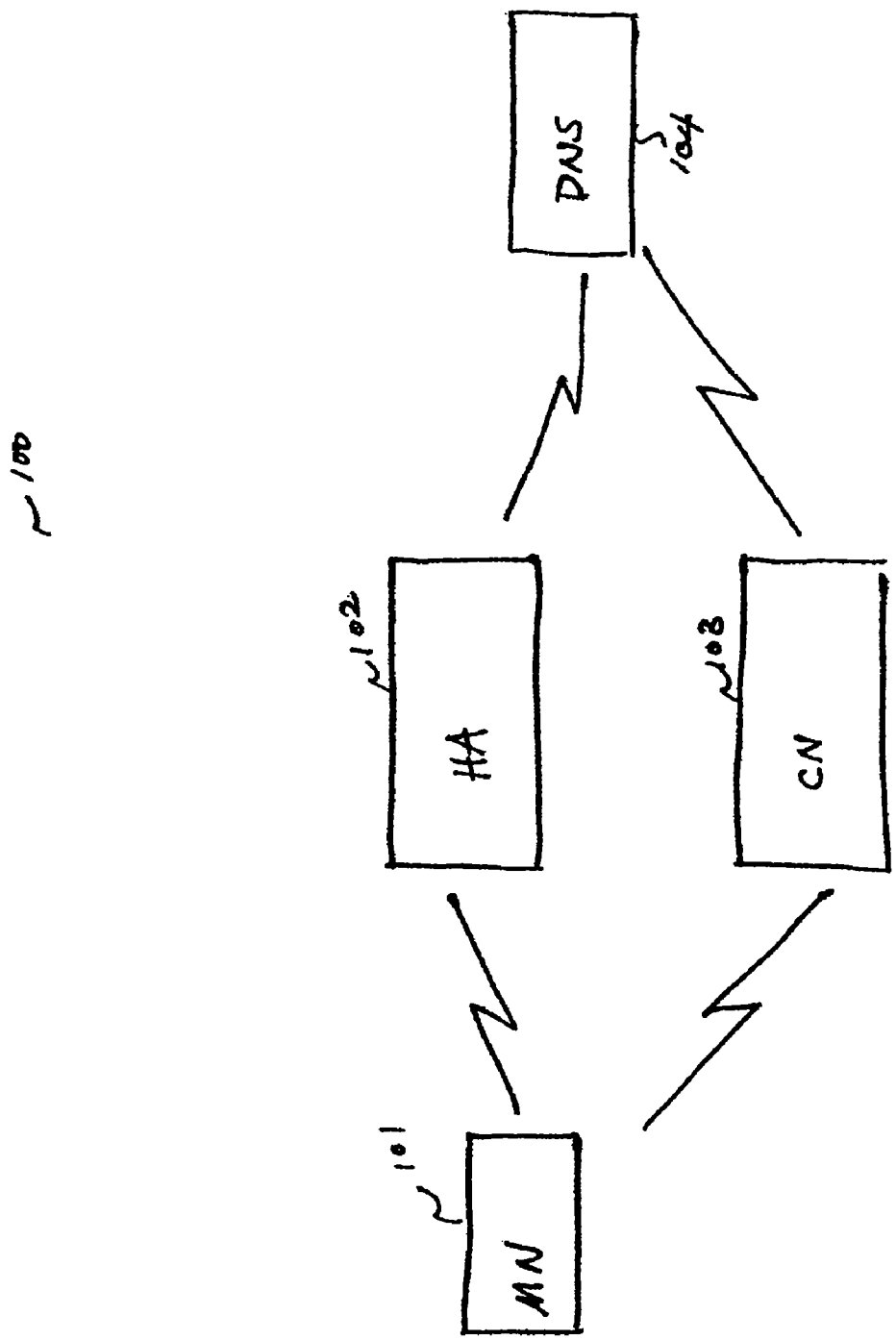
FIG. 1 is a simplified diagram illustrating a network system according to an embodiment of the present invention.

FIG. 1 is a simplified diagram illustrating a network system according to an embodiment of the present invention. This diagram is merely an example, which should not unduly limit the scope of the claims. One of ordinary skill in the art would recognize many variations, alternatives, and modifications. For example, the network system 100 is compatible with the Mobile IPv6 standard. In the network system 100, a mobile node is connected to a home agent (HA) 102 and a corresponding node (CN) 103. The HA 102 and the CN 103 are connected to a domain name server (DNS) 104.

The mobile node 101, as explained above is capable of wireless connectivity and moving to different locations while maintaining its wireless connectivity. For example, the mobile node 101 is compatible with the Mobile IPv6 standard. In a specific embodiment, the mobile node includes two more communication interfaces. For example, the mobile node is able to connect to two or more interfaces using the two interfaces respectively. As shown, the mobile node 101 is wirelessly connected to the HA 102 and the CN 103. Depending on the application, the mobile node 101 may be connected to other hosts and/or routers as well. The MN 101 is assigned with multiple CoA (MCoA). For example, the MN 101 has a CoA for connection with the HA 102 and another CoA for connection with the CN 103. IN addition, the MN 101 has MCoA for different services. For example, for the connection with the HA 102, the MN 101 uses two or more address for difference services (e.g., one for FTP and another for web). For each of the address, there is one or more corresponding MN The HA 102 is configured to provide wireless and/or radio access for the mobile node 101. For example, the HA 102 consists of an access router and/or a base station. In addition the HA 102 may include quality of service information related to serving the mobile node 101. According to a specific embodiment, the host 102 is configured to provide IP connection to the mobile node 101 in compliance with the Mobile IPv6 standard. For example, the host 102 is a correspondent node that includes multiple interfaces and/or addresses, each of which being used for a specific type of service. In addition, for each type of service there may be one or more ports for that service.

The HA 102 is connected to, as shown the CN 103. For example, both the HA 102 and the CN 103 are correspondent nodes in accordance with the Mobile IPv6 standard. The HA 102 has multiple interfaces and corresponding addresses for each of the interfaces. For example, the HA 102 has a file transfer protocol (FTP) interface that allows it to communicate other network entities for FTP related data transfers.

Similarly, the CN 103 uses multiple addresses. For example, the CN 103 is in accordance with the Mobile IPv6 standard, uses separate addresses for different applications (e.g., FTP and VoIP), thereby allow more efficient and scalable data connection.

It is to be understood that the CN 103 may have additional interfaces and corresponding address than the ones described above. For example, CN 103 may have addresses for web traffic, real time audio, etc. For each of the address there can be one or more port numbers. The information related to various addresses and applications thereof are stored by other nodes, such as the DNS 104. According to a specific example, the DNS 104 is a domain name server in compliance with the Mobile IPv6 standard. In a specific embodiment, the DNS 104 includes a database that stores specific information for, among other things, MN 101, HA 102, and the CN 103. For example, the DNS 104 stores records as shown in Table 1.

TABLE 1

| MN 101 | FTP application | ports 1-27 | 128.128.128.1 | misc. |
|---|---|---|---|---|
| MN 101 | web application | ports 28-64 | 128.128.128.2 | misc. |
| MN 101 | VoIP application | ports 65-126 | 128.128.128.3 | misc. |
| CN 103 | FTP application | ports 1-27 | 129.128.128.1 | misc. |
| CN 103 | web application | ports 28-64 | 129.128.128.2 | misc. |
| CN 103 | VoIP application | ports 65-126 | 129.128.128.3 | misc. |
| HA 102 | VoIP application | ports 1-23, 25 | 112.128.128.3 | misc |
| HA 102 | FTP application | ports 27-45 | 112.128.128.2 | misc |

According to embodiments, MN 101, HA 102, and the CN 103 send information (e.g., address, application, address, etc.) to the DNS 104 when they connect to the network system 100. For example, MN 101 sends records such as these shown in Table 1 when the HA 102 and the CN 103, as both HA 102 and the CN 103 keep records as shown in Table 1. During the operation of the network system 100, these records may be added, removed, modified, etc.

Figure 2:
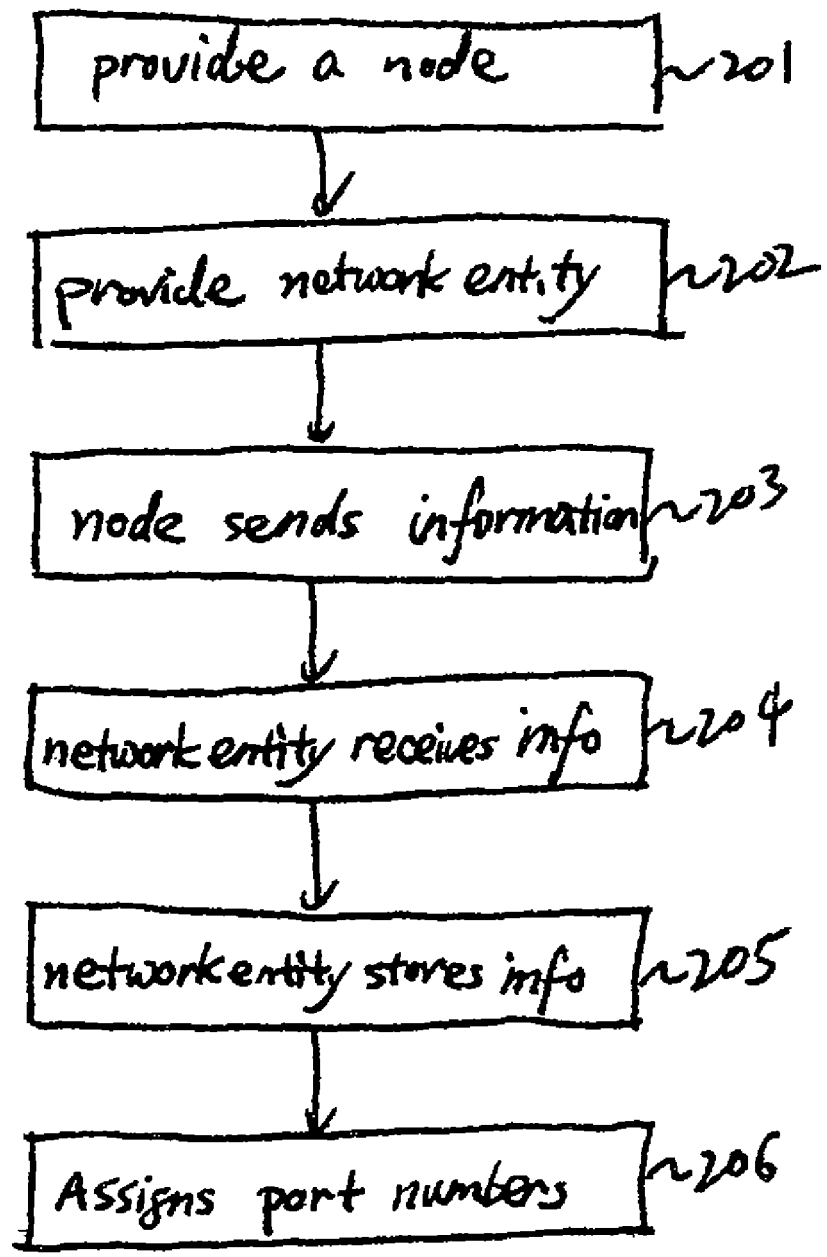
FIG. 2 is a simplified diagram illustrating a process for providing system information in a communication network according to an embodiment of the present invention.

FIG. 2 is a simplified diagram illustrating a process for providing system information in a communication network according to an embodiment of the present invention. This diagram is merely an example, which should not unduly limit the scope of the claims. One of ordinary skill in the art would recognize many variations, alternatives, and modifications. For example, various steps as outline may be added, removed, replaced, rearranged, repeated, overlapped, and/or partially overlapped, which should not limit the scope of the claims. Merely by way of example, the method is in accordance with the Mobile IPv6 standard.

At step 201, a node is provided. According to embodiments, the node can be an MN, a CN, or even a server. For example, the node includes two or more interface, and each of the interfaces is associated with a CoA. For example, a node has multiple CoAs. Typically, each of the interface and/or address is associated with a particular type of services, such as VoIP, web, etc. Each of the addresses may be associated with one or more port numbers. As explained above, the use of port numbers permits efficient data flow and management of data traffic. For example, port numbers can be used for filtering data flow.

At step 202, a network entity is provided. As an example, the network entity may simply be a different node (e.g., MN, CN, server, HA, etc.) The network entity is connected to the node. The network entity is configured to, among other things, store information associated with communication with the node. For example, the network entity stores various records as shown in Table 1.

At step 203, the node sends information associated data communication (e.g., CoA, port numbers, etc.) to the network entity. Depending on the situation, the node may send various types of information, such as information related to quality of service, connection type, etc. According to a specific embodiment, the information includes at least port number information.

FIG. 3 is a simplified diagram illustrating a message for providing network connectivity information. This diagram is merely an example, which should not unduly limit the scope of the claims. One of ordinary skill in the art would recognize many variations, alternatives, and modifications.

As shown in FIG. 3, a message 300 includes fields 301 and 302. In the field 301, the message 300 identifies, among other things, the connection type, status, etc. According to an embodiment, the message 300 is in compliance with the Mobile IPv6 standard. For example, the message is sent in accordance with the universal datagram protocol (UDP). As shown, the field 302 includes fields in two-tuples. Among other things, each two-tuple is used to identify one or more port numbers. For example, the first entry in each two-tuple is associated with a port number, and the second entry is associated with a length (i.e., the number of port numbers are allocated, beginning from the port number indicated by the first entry). Depending on the application, the two-tuple format can be used for indicating both source ports and destination ports.

The followings are exemplary two-tuples for port numbers:
3401, 5; 3407, 2
This specification illustrates that port number 3401, 3402, 3403, 3404, 3405, 3407, 3408 will all be specified as part of the binding in a single flow identification type message.
1099, 4; 3001, 1; 3023, 2; 6500, 7
This specification illustrates that port number 1099, 1100, 1101, 1102, 3001, 3023, 3024, 6500, 6501, 6502, 6503, 6504, 6505, 6506 will all be specified as part of the binding in a single flow identification type message.
4001, 1
This specification illustrates that only port number 4001 will used for flow binding to a particular CoA.

As shown above, the each two-tuple is separated by a comma between the port entry and the length entry. Two-tuples are separated by a semicolon. It is to be understood that other symbols may be used as well. In certain embodiments, these symbols are not used, as the first entry and the second entry is simplified placed into the appropriate fields.

Figure 4:
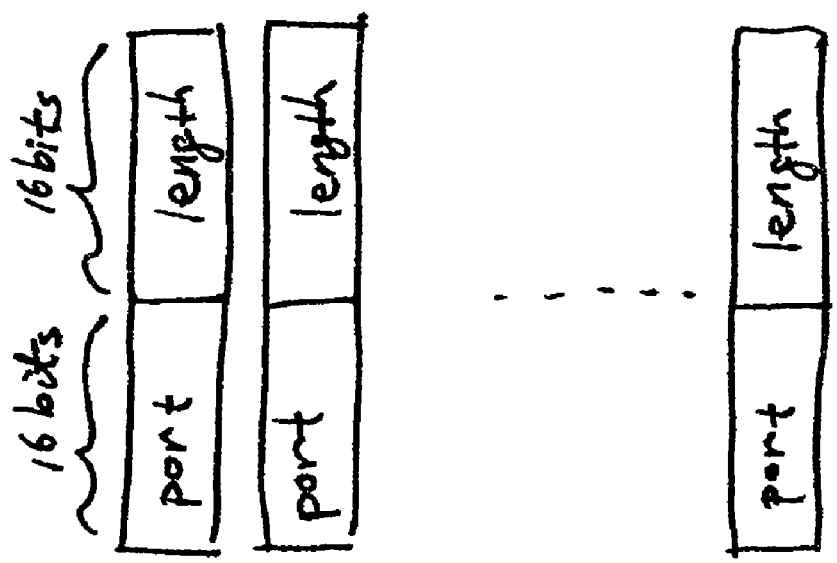
FIG. 4 is a simplified diagram illustrating a specific format for port number fields according to an embodiment of the present invention.

FIG. 4 is a simplified diagram illustrating a specific format for port number fields according to an embodiment of the present invention. This diagram is merely an example, which should not unduly limit the scope of the claims. One of ordinary skill in the art would recognize many variations, alternatives, and modifications. As shown in FIG. 4, port numbers are specific by two-tuples. Each of the two-tuples are 32 bits in length, with port number field and the length field each occupying 16 bits. It is to be understood that depending on the applications, there might be other formats as well.

Now referring back to FIG. 2. At step 204, the network entity receives information from the node. For example, the network entity receives information via a specific data communication link.

At steps 205, the network entity stores received information. For example, the network entity records this information as records.

At step 206, the network entity assigns port numbers. Once assigned, the port numbers can be used for future communications. The port numbers are assigned based on the information received using the format listed above. For example, the network entity sends data to the ports of the nodes based on what has been assigned. In addition, the network entity may send information associated with the port numbers to other entities.

According to an embodiment, the present invention provides a method for providing networking routing in compliance with a Mobile IP protocol. The method includes providing a mobile node, which includes a plurality of interfaces. The plurality of interfaces includes a first interface and a second interface. The first interface is associated with a first service, a second service, and a first address. The second interface is associated with a third service and a second address. The method also includes providing a home agent that is configured to store a plurality of entries associated with mobile nodes. The method additionally includes sending a first packet from the mobile node to the home agent. The first packet includes at least a first entry and a second entry. The first entry includes at least the first interface, the first service, the first address, and port numbers being associated with the first service and the second service. The port numbers are nonconsecutive. The method further includes storing at least the first entry and the second entry by the home agent. For example, the embodiment is illustrated in FIG. 2.

According to another embodiment, the present invention provides a system for providing networking routing in compliance with a Mobile IP protocol. The system includes a node that includes a plurality of interfaces. The plurality of interfaces includes a first interface and a second interface. The first interface is associated with a first service, a second service, and a first address. The second interface is associated with a third service and a second address. The system additionally includes a database. The database is configured to store a plurality of entries associated with mobile nodes. The node sends a first packet to the database. The first packet includes at least a first entry and a second entry. The first entry includes information for at least the first interface, the first service, the first address, and port numbers being associated with the first service and the second service, the port numbers being nonconsecutive. For example, the system is illustrated in FIG. 1.

According to yet another embodiment, the present invention provides a method for providing networking routing in compliance with a Mobile IP protocol. The method includes providing a node. The node includes a plurality of interfaces. The plurality of interfaces includes a first interface and a second interface. The first interface is associated with a first service, a second service, and a first address. The second interface is associated with a third service and a second address. The method also includes providing a home agent. The home agent is configured to store a plurality of entries associated with mobile nodes. The method further includes receiving a first packet from the node by the home agent. The first packet includes at least a first entry. The first entry includes information for at least the first interface, the first service, the second service, a first port number, a second port number, and at least a first port count and a second port count. The first port number and the second port number are nonconsecutive. In addition, the method includes assigning a first plurality of port numbers to the first service using the first port number and the first port count. Also, the method includes assigning a second plurality of port numbers to the second service using the second port number and the second port count. For example, the embodiment is illustrated in FIG. 2.

It is to be appreciated that the various embodiments of the present invention provide advantages over conventional techniques. In various embodiments, the present invention provides a technique for providing and updating various system information from one node to another, thereby allowing the efficient routing of data. In a specific embodiment, the present invention provides a method in mobile node provides information associated with data transmission to other nodes in an efficient manner. In addition, it is to be appreciated that embodiments of the present invention can be implemented in conjunction with conventional network techniques and standards (e.g., the Mobile IPv6 standard). For example, various embodiments of the present invention are compatible with conventional techniques and easily implemented. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing networking routing in compliance with a Mobile IP protocol, the method comprising providing a mobile node, the mobile node including a plurality of interfaces, the plurality of interfaces including a first interface and a second interface, the first interface being associated with a first service, a second service, and a first address, the second interface being associated with a third service and a second address;

providing a home agent, the home agent being configured to store a plurality of entries associated with mobile nodes;

sending a first packet from the mobile node to the home agent, the first packet including at least a first entry and a second entry, the first entry including at least the first interface, the first service, the first address, and port numbers being associated with the first service and the second service, the port numbers being nonconsecutive; and storing at least the first entry and the second entry by the home agent.

2. The method of claim 1 wherein the first entry includes a first two-tuple and a second two-tuple, the first two-tuple including a first port number and a first length number, the second two-tuple including a second port number and a second length number.

3. The method of claim 2 wherein:
the first port number and the second port number are separated by a first symbol;
the first two-tuple and the second two-tuple are separated by a second symbol, the first symbol and the second symbol are different.

4. The method of claim 2 wherein the first port number is stored by a 16-bit memory.

5. The method of claim 1 wherein the port numbers comprise destination port numbers.

6. The method of claim 1 wherein:
the first entry being in compliance with a Mobile IPv6 format;
the first entry comprises a first field and a second field, the first field storing a port number, the second field storing a length associated with the port number.

7. The method of claim 1 wherein the port numbers comprise source port numbers.

8. The method of claim 1 wherein the mobile node comprises a portable computer.

9. The method of claim 1 wherein the mobile node comprises a cellular phone.

10. The method of claim 1 further comprising registering the mobile node.

11. The method of claim 1 wherein the home agent comprises a data base for storing entries.

12. The method of claim 1 wherein:
the first entry comprises a first port number and a first count, the first port number and the first count being separated by a first symbol, the first counting indicating a number of consecutive port numbers associated with the first service.

13. The method of claim 1 wherein:
the first entry comprises a first port number and a first count, the first port number and the first count being separated by a first symbol, the first counting indicating a number of consecutive port numbers associated with the first service;
the first entry further comprises a second port number and a second count, the second port number being separated from first count by a second symbol.

14. The method of claim 1 wherein the port numbers are further associated with the third service.

15. The method of claim 1 wherein the plurality of entries comprises cache binding entries.

16. A system for providing networking routing in compliance with a Mobile IP protocol, the system comprising a node, the node including a plurality of interfaces, the plurality of interfaces including a first interface and a second interface, the first interface being associated with a first service, a second service, and a first address, the second interface being associated with a third service and a second address;

a database, the database being configured to store a plurality of entries associated with mobile nodes;

wherein the node sends a first packet to the database, the first packet including at least a first entry and a second entry, the first entry including information for at least the first interface, the first service, the first address, and port numbers being associated with the first service and the second service, the port numbers being nonconsecutive.

17. The system of claim 16 wherein the database assigns a first plurality of port numbers to the first service using the first entry.

18. The system of claim 16 wherein the first entry being in compliance with the Mobile IPv6 standard.

19. The system of claim 16 wherein the database is associated with a home agent.

20. The system of claim 16 wherein the database is associated with a domain name server.

21. The system of claim 16 wherein the node comprises a mobile node.

22. The system of claim 16 wherein the node comprises a corresponding node.

23. A method for providing networking routing in compliance with a Mobile IP protocol, the method comprising providing a node, the node including a plurality of interfaces, the plurality of interfaces including a first interface and a second interface, the first interface being associated with a first service, a second service, and a first address, the second interface being associated with a third service and a second address;

providing a home agent, the home agent being configured to store a plurality of entries associated with mobile nodes;

receiving a first packet from the node by the home agent, the first packet including at least a first entry, the first entry including information for at least the first interface, the first service, the second service, a first port number, a second port number, and at least a first port count and a second port count, the first port number and the second port number being nonconsecutive;

assigning a first plurality of port numbers to the first service using the first port number and the first port count; and assigning a second plurality of port numbers to the second service using the second port number and the second port count.

24. The method of claim 23 wherein the first port and the first port count are separated by a first symbol, the first symbol being in accordance with a mobile IP standard.

25. The method of claim 24 wherein the second port and the first port count are separated by a second symbol, the first symbol and the second symbol being different.

26. The method of claim 24 wherein the node comprises a mobile node.

27. The method of claim 24 wherein the node comprises a corresponding node.

28. The method of claim 24 wherein the home agent provides wireless connectivity for the node.

29. The method of claim 24 furthering comprising sending a second packet from to a first port of the node, the first port being associated with the first plurality of port numbers.

* * * * *

UNITED STATES PATENT AND TRADEMARK OFFICE
CERTIFICATE OF CORRECTION

PATENT NO.        : 7,822,003 B2                                          Page 1 of 1
APPLICATION NO.   : 11/755637
DATED             : October 26, 2010
INVENTOR(S)       : Williams et al.

It is certified that error appears in the above-identified patent and that said Letters Patent is hereby corrected as shown below:

In Col. 12, line 4, claim 29, delete "from".

Signed and Sealed this

Twenty-first Day of December, 2010

David J. Kappos
*Director of the United States Patent and Trademark Office*